United States Patent Office 3,254,882
Patented June 7, 1966

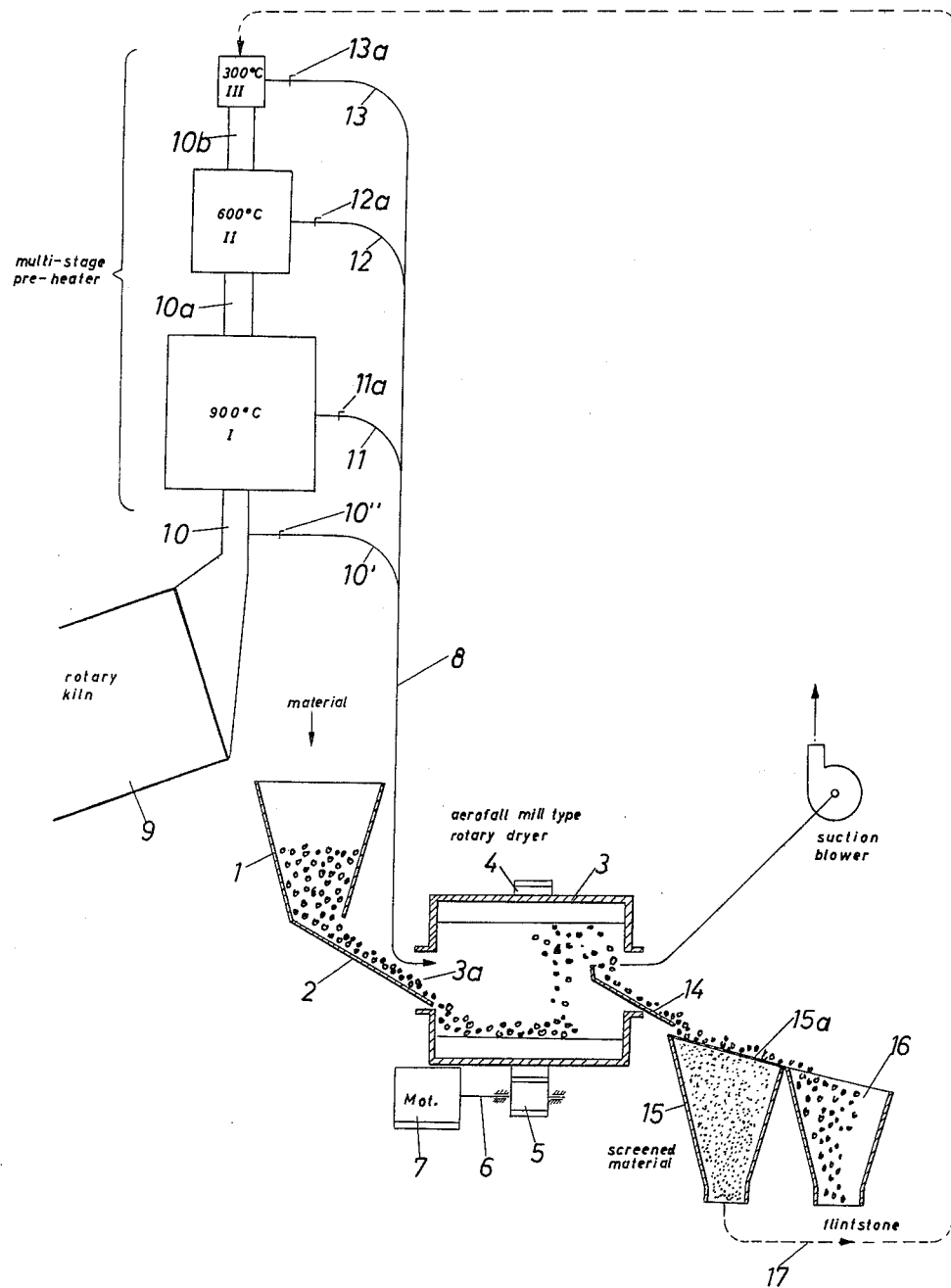

3,254,882
METHOD OF AND ARRANGEMENT FOR DRESSING MOIST RAW MATERIALS WITH SOLID UNDESIRED INCLUSIONS
Bernd H. Helming, Neubeckum, Westphalia, Germany, assignor to Polysius G.m.b.H., Neubeckum, Westphalia, Germany
Filed Dec. 5, 1963, Ser. No. 339,567
Claims priority, application Germany, Dec. 10, 1962, P 30,734
4 Claims. (Cl. 263—32)

The present invention relates to a method of and arrangement for dressing moist raw materials having solid undesired inclusions therein.

Various raw materials for producing cement, iron ore sinter, swelling clay (Blähton), etc., frequently contain undesired inclusions, as for instance flintstone, which have to be eliminated from the raw mixture at the start of the dressing operation. This is mostly the case for instance when, for purposes of the production of cement, the raw mixture is prepared from flintstone-containing chalk. In order to remove the flintstones, heretofore the wet dressing process has been practiced by transforming the chalk into a paste by the addition of water. After the chalk has been made into a paste, the flintstones are either collected at the bottom of the paste-containing vessel or are screened off from the paste or slurry. This wet process of removing flintstones from chalk is highly disadvantageous inasmuch as a considerable amount of fuel is required for the burning of the raw material thus prepared.

It is, therefore, an object of the present invention to provide a method of and arrangement for dressing moist raw materials having solid undesired inclusions therein, which will overcome the above-mentioned drawbacks.

It is another object of this invention to provide a method of and arrangement for a dry dressing of chalk or other raw materials employed for the production of cement, which contain solid undesired inclusions.

These and other objects and advantages of the invention will appear more clearly from the following specification in connection with the accompanying drawing illustrating an arrangement according to the invention for a dry process removal of undesired inclusions from raw materials used for the production of cement.

While the arrangement shown in the drawing will now be described in connection with the removal of inclusions in chalk, it is, of course, to be understood that the present invention is not limited to chalk as starting material.

More specifically referring to the drawing, the arrangement shown therein comprises a funnel 1 into which the raw material obtained from the quarry is charged. A chute 2 feeds this raw material into a rotary dryer 3 in form of a drum having its periphery provided with a gear ring 4 meshing with a pinion 5 mounted on a shaft 6 of a motor 7 so that rotation of the motor 7 will rotate the aerofall mill type rotary dryer 3. The inside of the aerofall mill type rotary dryer 3 is provided with blade means extending in axial direction of the rotary dryer which blade means act as a kind of scoop to lift the raw material and to allow the same to drop back whereby the raw material is broken up and the rotary dryer acts, so to speak, as a mill without grinding bodies. The rotary dryer 3 has an inlet port 3a communicating with conduit means 8 through which drying gases pass in unidirectional flow from a rotary kiln 9. These drying gases which may be represented by the flue gases of the rotary kiln pass into a conduit 10 leading into preheating stages I, II and III which are interconnected by conduits 10a and 10b. From each of said preheating stages, outlet conduits 11, 12 and 13 respectively lead into the conduit 8. Each of the conduits 11, 12 and 13 contains a shut-off valve 11a, 12a and 13a respectively for selectively interrupting communication of the respective preheating stage with conduit 8. The preheating stages are charged with dry raw meal. These preheaters are so operated that, depending on the water content of the chalk to be dried and broken up, only so much heat and such a quantity of flue gases are conveyed through the preheating stages that a sufficient quantity of heat will be passed through conduit 8 into the rotary dryer for sufficiently drying the chalk therein. Thus, for instance, in conformity with the heat requirement in rotary dryer 3, only pre-heating stage III or preheating stages III and II may be shut-off by shutting off the respective valves 13a and 12a. These valves may be shut off manually or by any other automatic control device. As will be evident from the above, the preheating stages are so controlled that the rotary dryer will receive only the amount of heat required for the drying of the material therein. It will also be evident that by making the multi-stage preheater more or less effective, the degree of efficiency of the preheater is varied in conformity with the heat requirement of the rotary dryer. The heat energy conveyed to the kiln 9 may thus be varied in conformity with the requirement of the kiln and the requirement of the dryer 3. The total heat requirement for burning and drying may thus be held to a minimum.

After the material has been dried and simultaneously been broken up in the rotary dryer 3 so that the flintstones have been separated from the chalk, the processed material is passed by a chute 14 over a screen 15a on top of a raw meal receiving container 15 so that the raw meal passes through the screen 15a into container 15 while the flintstones pass into another collecting container 16. The raw meal may then from container 15 be passed to the multi-stage pre-heater along the path 17 or, if desired, may be further processed before being conveyed to the preheater or directly into the kiln.

As will be evident from the above, the method according to the present invention is characterized in that only one heating source is required, namely the rotary kiln 9, and that the rotary kiln need receive only such a quantity of heat energy that sufficient heat energy will be available for the burning process, for the drying in the aerofall mill type rotary dryer and the preheating in the respective effective preheating stages. The method and arrangement according to the present invention is, therefore, characterized by a minimum heat requirement.

The arrangement furthermore comprises a suction blower for the purpose of giving the rotary kiln the necessary draft and compensating the resistance produced by the intermediate incorporation of preheater and aerofall mill type rotary dryer.

In certain circumstances an additional connecting conduit 10' may be provided leading directly from conduit 10 to conduit 8 with a control valve 10" in said additional conduit for controlling the flow of gas therethrough. In these circumstances flue gases from the rotary kiln may be conveyed directly from the kiln through conduit 8 into the rotary dryer without passing through the preheater means.

It is, of course, to be understood that the present invention is, by no means, limited to the particular method and arrangement set forth above but also comprises any modifications within the scope of the appended claims.

What I claim is:
1. A method of removing undesired hard inclusions from moist raw materials the basic substance of which is less hard than the inclusions for producing particularly cement, iron ore sinter and blow clay, in a kiln equipped with multistage preheating means for preheating the material to be burned in said kiln, which includes the steps of: feeding dried material, free of solid inclusions, to be burned in said kiln successively through the stages of said preheating means, passing flue gases from said kiln to at least the final stage of said preheating means for preheating the dried material therein, conveying flue gases from said kiln through at least said final stage of said preheating means to moist raw material which is in substantially the condition in which it has been received from a quarry for drying said moist material and simultaneously with said drying of said moist material repeatedly lifting and dropping said material for breaking up said material by impact to thereby free the solid inclusions in the material from the remaining portion of said material which is to be fed into said kiln, adjusting the quantity of flue gas being conveyed to said moist material being dried and broken up in conformity with the heat requirement for drying said moist material, and delivering the said remaining portion of the material to said preheating means to be fed therethrough.

2. A method according to claim 1 in which said solid inclusions and said remaining portion of the material are collected separately following the said breaking up of said material.

3. In combination with the burning of dried material in a kiln, especially for producing cement, iron ore sinter and swelling clay, an arrangement for dressing in a dry process moist raw material containing undesired solid inclusions, especially stones; a rotary kiln, preheating means comprising a plurality of serially connected stages adapted to receive dried raw material to be preheated prior to being charged into and burned in said kiln, first conduit means leading from said kiln serially through the stages of said preheating means for conveying flue gases to said preheating means, rotary dryer means adapted to receive moist raw material to be dressed, second conduit means leading from the individual stages of said preheating means to said rotary means to convey flue gases passed through the respective stages of said preheating means into said rotary dryer means for drying said raw material therein, means for individually controlling said second conduit means, said rotary dryer means including means for breaking up the raw material therein, discharging means associated with said rotary dryer means for discharging therefrom dried material broken up in said dryer means and also inclusions freed in said rotary dryer means from said broken up material, and separating means arranged adjacent said discharging means and adapted to receive broken up material and inclusions and separating said dried material from said inclusions.

4. An arrangement according to claim 3, in which said rotary dryer means is provided with means for alternately lifting and dropping the material therein to thereby break up the material by impact.

References Cited by the Examiner

UNITED STATES PATENTS

| 2,754,105 | 7/1956 | Pistorius et al. | 263—33 |
| 2,760,768 | 8/1956 | Kennedy | 263—32 |
| 2,883,173 | 4/1959 | Laboulais | 263—32 |

FOREIGN PATENTS

| 826,683 | 1/1960 | Great Britain. |

WILLIAM F. O'DEA, *Primary Examiner.*

JOHN J. CAMBY, *Examiner.*

D. A. TAMBURRO, *Assistant Examiner.*